United States Patent
Arai

(10) Patent No.: US 11,631,053 B2
(45) Date of Patent: Apr. 18, 2023

(54) INFORMATION PROCESSING APPARATUS AND NON-TRANSITORY COMPUTER READABLE MEDIUM FOR PREVENTING STAGNATION IN WORKFLOW

(71) Applicant: FUJIFILM Business Innovation Corp., Tokyo (JP)

(72) Inventor: Shiori Arai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 99 days.

(21) Appl. No.: 17/037,707

(22) Filed: Sep. 30, 2020

(65) Prior Publication Data
US 2021/0304145 A1    Sep. 30, 2021

(30) Foreign Application Priority Data
Mar. 26, 2020    (JP) .............................. JP2020-056084

(51) Int. Cl.
| | | |
|---|---|---|
| *G06Q 10/10* | (2012.01) | |
| *G06Q 10/06* | (2012.01) | |
| *G06Q 10/0631* | (2023.01) | |
| *G06Q 10/105* | (2023.01) | |
| *G06Q 10/1093* | (2023.01) | |

(52) U.S. Cl.
CPC ... *G06Q 10/103* (2013.01); *G06Q 10/063118* (2013.01); *G06Q 10/105* (2013.01); *G06Q 10/1097* (2013.01)

(58) Field of Classification Search
CPC .................................................. G06Q 10/103
See application file for complete search history.

(56) References Cited

U.S. PATENT DOCUMENTS

| | | | | |
|---|---|---|---|---|
| 2005/0131748 A1* | 6/2005 | Parker | ................... | G06Q 50/188 705/80 |
| 2005/0288987 A1* | 12/2005 | Sattler | ................ | G06Q 10/1093 705/7.18 |
| 2013/0311559 A1* | 11/2013 | Swinson | ................ | G06Q 10/06 709/204 |
| 2016/0180280 A1* | 6/2016 | Philipp | .......... | G06Q 10/063116 705/7.16 |
| 2017/0083867 A1* | 3/2017 | Saxena | ................ | G06Q 10/103 |

FOREIGN PATENT DOCUMENTS

| | | | |
|---|---|---|---|
| JP | 2006079381 A | * | 3/2006 |
| JP | 2007156678 | | 6/2007 |
| JP | 2011-191964 | | 9/2011 |
| JP | 2013200753 A | * | 10/2013 |

OTHER PUBLICATIONS

Jason Crampton and Hemanth Khambhammettu, "Delegation and Satisfiability in Workflow Systems," Jun. 11-13, 2008, SACMAT 2008, pp. 31-40 (Year: 2008).*

* cited by examiner

*Primary Examiner* — Amanda Gurski
(74) *Attorney, Agent, or Firm* — JCIPRNET

(57) ABSTRACT

An information processing apparatus includes a processor configured to acquire a schedule of one or more users registered in a workflow system and notify a user who has a possibility of making a request that a specific user who processes the request plans to be absent if a plan of absence of the specific user is detected.

17 Claims, 15 Drawing Sheets

| REQUESTER | AVERAGE VALUE OF USAGE FREQUENCY | AVERAGE VALUE OF PERIOD FROM TIME OF REQUEST TO DESIRED DEADLINE |
|---|---|---|
| USER A | FOUR TIMES/MONTH | 5 DAYS |
| USER B | ONCE/MONTH | 3 DAYS |
| USER C | ONCE/YEAR | 7 DAYS |
| ⋮ | ⋮ | ⋮ |

| USER | BUSINESS ASSISTANCE APPLICATION ||||||||||
|---|---|---|---|---|---|---|---|---|---|
| | X | Y | Z | XX | XY | ZY | ... | LINKAGE-1 | LINKAGE-2 |
| A | ○ | ○ | ○ | | | | | ○ | |
| B | ○ | ○ | ○ | | | | | ○ | |
| C | ○ | ○ | ○ | | | | | ○ | ○ |
| D | ○ | ○ | ○ | ○ | | | | ○ | ○ |
| E | ○ | ○ | ○ | ○ | ○ | ○ | | ○ | ○ |
| ... | | | | | | | | | |

○: AUTHORIZED

INFORMATION PROCESSING APPARATUS AND NON-TRANSITORY COMPUTER READABLE MEDIUM FOR PREVENTING STAGNATION IN WORKFLOW

CROSS-REFERENCE TO RELATED APPLICATIONS

This application is based on and claims priority under 35 USC 119 from Japanese Patent Application No. 2020-056084 filed Mar. 26, 2020.

BACKGROUND

(i) Technical Field

The present disclosure relates to information processing apparatuses and non-transitory computer readable media.

(ii) Related Art

Japanese Unexamined Patent Application Publication No. 2007-156678 discloses a workflow system that circulates an electronic document in accordance with a path set in a workflow and approves or authorizes the electronic document. This workflow system is provided with a function for setting an officer ranked higher than an approver or an authorizer as a substitute if a workflow process of the electronic document has exceeded a stagnation time limit.

SUMMARY

However, if a user capable of performing the approval is limited to a specific individual or if authorization by a substitute is not permitted, the stagnation of the circulation is not eliminated even with the technology disclosed in Japanese Unexamined Patent Application Publication No. 2007-156678.

Aspects of non-limiting embodiments of the present disclosure relate to the prevention of stagnation of circulation, as compared with a case where a user capable of serving as a substitute for approval is searched for after stagnated circulation is detected.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to acquire a schedule of one or more users registered in a workflow system and notify a user who has a possibility of making a request that a specific user who processes the request plans to be absent if a plan of absence of the specific user is detected.

BRIEF DESCRIPTION OF THE DRAWINGS

Exemplary embodiments of the present disclosure will be described in detail based on the following figures, wherein:

FIG. 5 illustrates a specific example of the application-usage-status DB;

FIG. 6 illustrates a structural example of data stored in a user authorization DB;

DETAILED DESCRIPTION

Exemplary embodiments of the present disclosure will be described below with reference to the drawings.

EXEMPLARY EMBODIMENT

System Configuration

Figure 1:
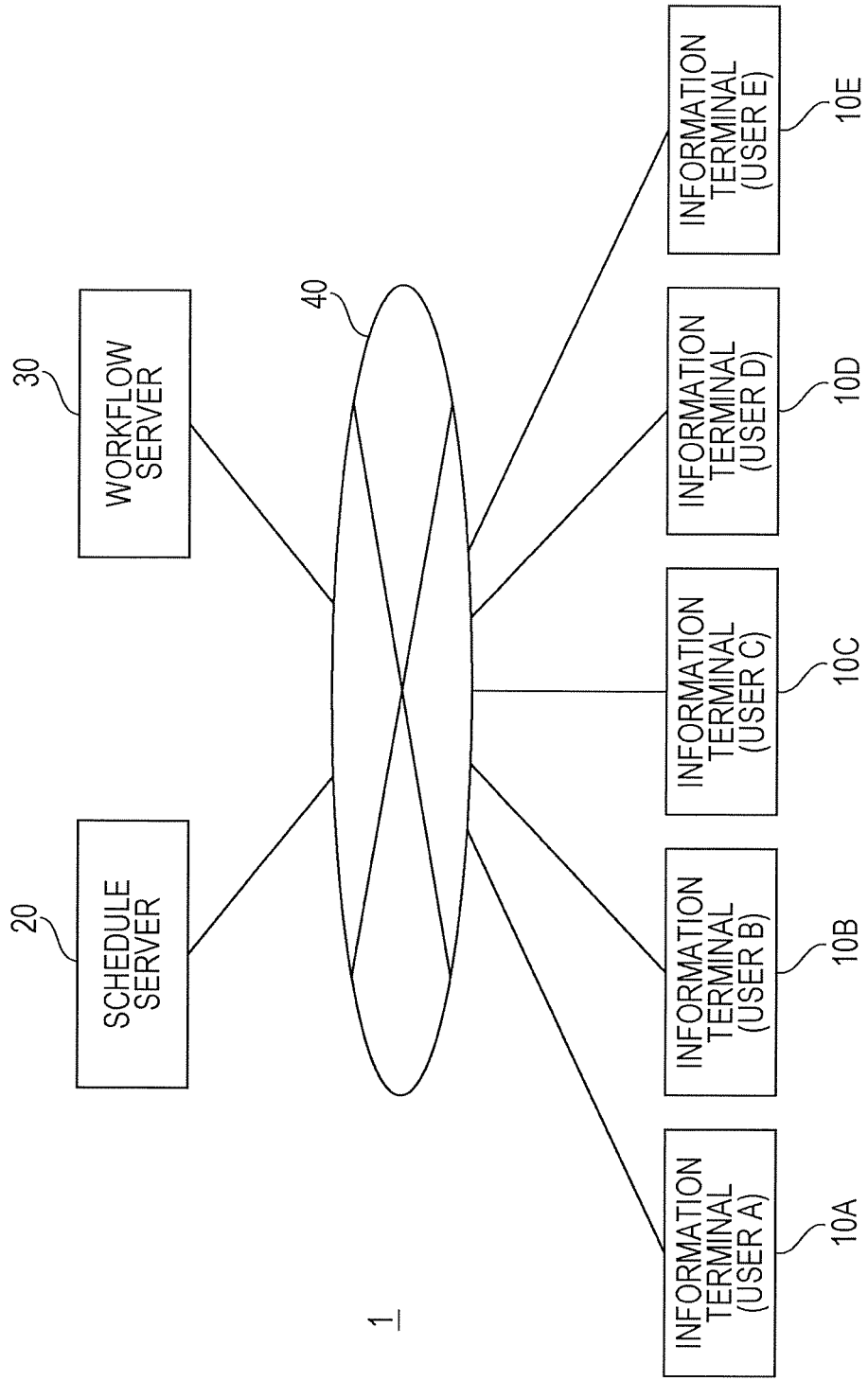
FIG. 1 illustrates a configuration example of a workflow management system used in an exemplary embodiment.

FIG. 1 illustrates a configuration example of a workflow management system 1 used in an exemplary embodiment.

The workflow management system 1 shown in FIG. 1 has information terminals 10A to 10E operated by users authorized to use a workflow, a schedule server 20 that manages the schedule of each user, and a workflow server 30 that controls the flow of a business operation defined as a workflow.

All of these terminals are connected to a network 40. In this exemplary embodiment, the network 40 is a local area network (LAN). Alternatively, the network 40 may entirely or partially be the Internet.

In this exemplary embodiment, the term "workflow" refers to the flow of a business operation with which multiple users are involved.

The workflow in this exemplary embodiment is defined by a combination of steps, such as a request step, an approval step, an authorization step, and a storage step. The contents and the combination of the steps defining the workflow vary depending on the purpose for putting the workflow into practice as well as the business operator putting the workflow into practice.

Examples of electronic documents handled in the workflow include a document created with a business-related application program, an electronic mail, a document electronically converted from a paper document, a photograph, an image, and so on. An application program will be referred to as "application" hereinafter.

In this exemplary embodiment, an application that assists with a user's business operation by operating in cooperation with the workflow may sometimes be referred to as "business assistance application".

In the case of FIG. 1, the information terminal 10A is a terminal operated by a user A. The information terminal 10B is a terminal operated by a user B. The information terminal 10C is a terminal operated by a user C. The information terminal 10D is a terminal operated by a user D. The information terminal 10E is a terminal operated by a user E. Terminals operated by unspecified users are referred to as information terminals 10.

Although it is assumed that there are five users in FIG. 1, the number of users is arbitrary.

The information terminal 10 operated by each user does not necessary have to be a dedicated terminal for a specific user. In the case of this exemplary embodiment, a user operating an information terminal 10 is identified from an account used for a log-in process.

Each information terminal is, for example, a desktop computer, a notebook computer, a tablet computer, or a smartphone.

The schedule server 20 manages the schedule of each user authorized to use the workflow. In this exemplary embodiment, examples of the schedule include a work schedule, a schedule for an outing, such as a business trip, and a holiday schedule. Another example may be a meeting schedule.

In this exemplary embodiment, a period in which a user does not plan to access the workflow and perform a business operation will be referred to as "absent period". One example of an absent period is a non-business day or days or a holiday that a user has personally made a request for.

The workflow server 30 manages the delivery of electronic documents in the workflow, as well as the progress of processes.

In this exemplary embodiment, a corresponding business assistance application is prepared for each of the steps defining the workflow. Examples of business assistance applications include an attribute managing application, an attribute setting application, an electronic-document managing application, and an electronic-document-usage-related application.

The attribute managing application provides, for example, a function for extracting a title from an electronic document and registering the title in a database. The attribute setting application provides a function for analyzing an electronic document and registering an attribute in a database. The term "register" used here includes addition. The electronic-document managing application provides a function for adding a file name to an electronic document in accordance with a rule and a function for setting a folder for storing an electronic document therein in accordance with a rule. The electronic-document-usage-related application provides a function for transmitting an electronic document in accordance with a rule. The contents of each business assistance application vary depending on the contents of the workflow.

The workflow server 30 according to this exemplary embodiment is an example of an information processing apparatus.

As an alternative to this exemplary embodiment in which the schedule server 20 and the workflow server 30 are described as being servers independent of each other, the schedule server 20 and the workflow server 30 may be a single server.

As an alternative to the case of FIG. 1 in which the schedule server 20 and the workflow server 30 are connected to the same network 40, the connection therebetween may be realized using different networks.

Furthermore, as an alternative to the workflow management system 1 shown in FIG. 1 that has a single schedule server 20 and a single workflow server 30, each server may achieve its function by having multiple servers operating in cooperation with each other.

Configuration of Schedule Server

Figure 2:
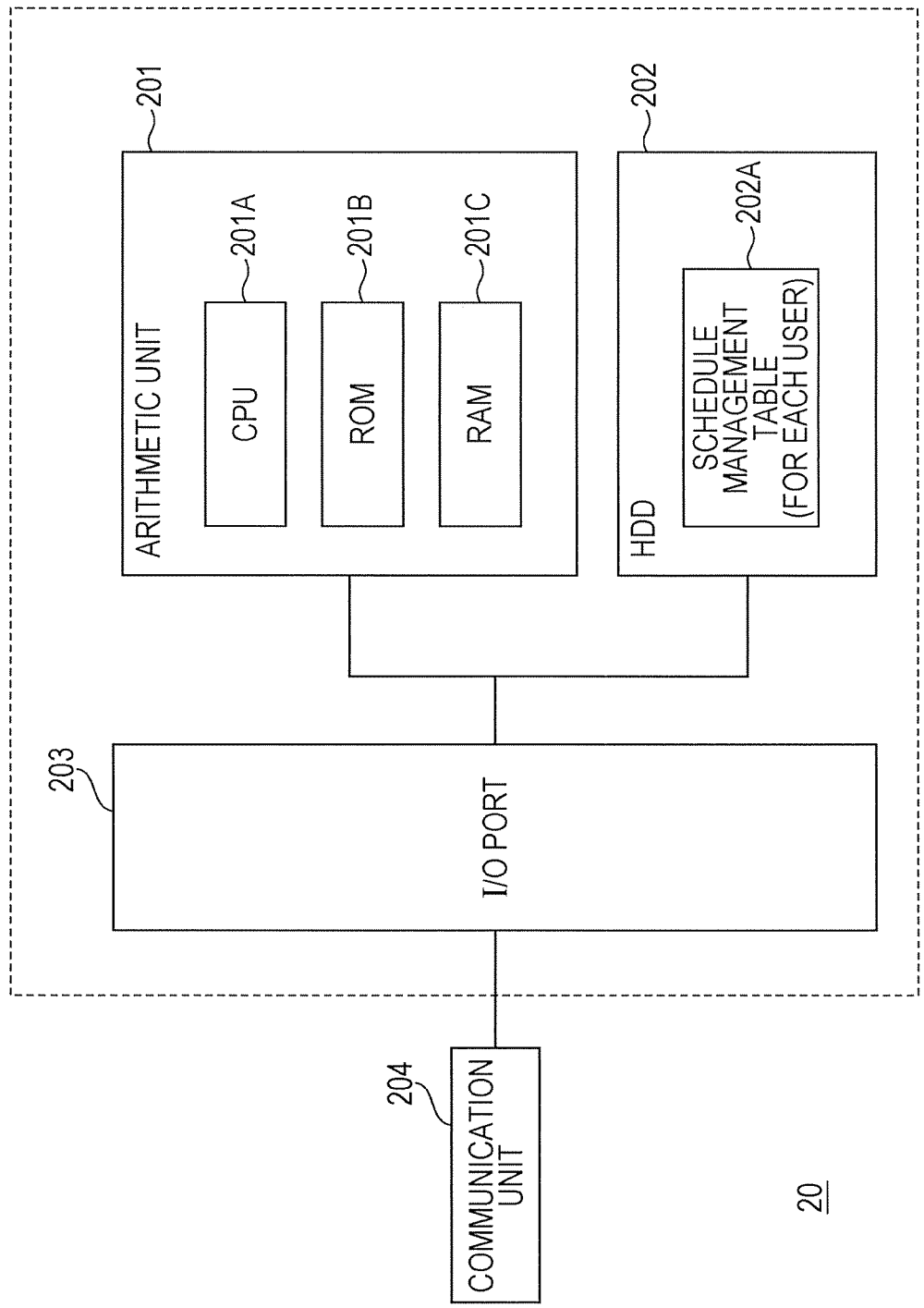
FIG. 2 illustrates a configuration example of a schedule server used in this exemplary embodiment.

FIG. 2 illustrates a configuration example of the schedule server 20 used in this exemplary embodiment.

The schedule server 20 shown in FIG. 2 has an arithmetic unit 201 that controls the operation of the entire apparatus, a hard disk drive (HDD) 202, an input/output (I/O) port 203, and a communication unit 204 that realizes communication with an external apparatus. These units are connected by various types of signal lines.

The arithmetic unit 201 is provided with a central processing unit (CPU) 201A as an example of a processor, a read-only memory (ROM) 201B having a basic input output system (BIOS) stored therein, and a random access memory (RAM) 201C used as a work area.

The arithmetic unit 201 is a so-called computer that provides various types of functions by executing programs, such as business assistance applications.

The HDD 202 is a device that drives a magnetic disk serving as a nonvolatile storage medium, and is used as a database that stores therein various types of data.

In the case of FIG. 2, a schedule management table 202A is shown as one example of the various types of data. The schedule management table 202A according to this exemplary embodiment is used for managing the schedule for each user.

Configuration of Workflow Server

Figure 3:
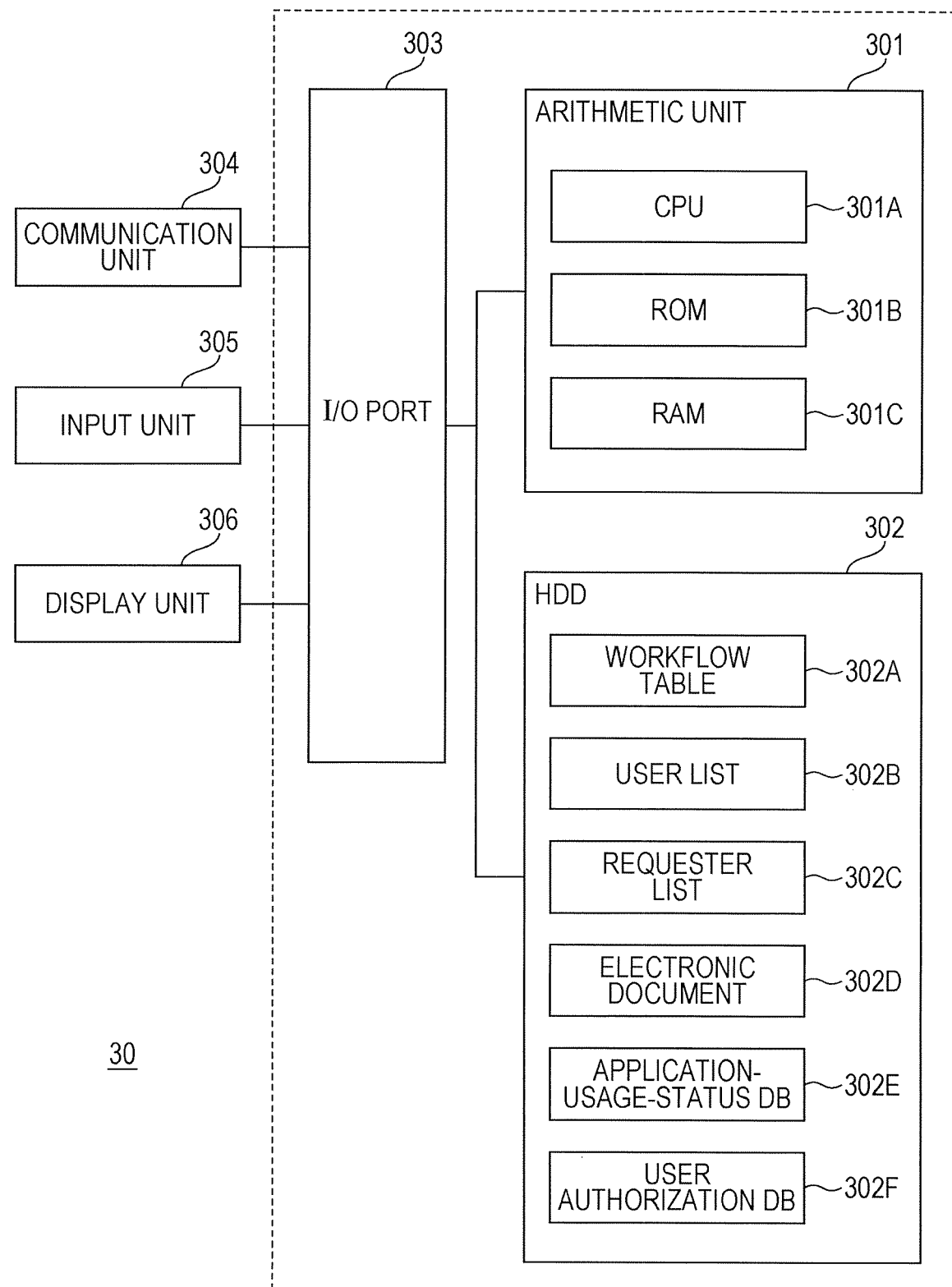
FIG. 3 illustrates a configuration example of a workflow server used in this exemplary embodiment.

FIG. 3 illustrates a configuration example of the workflow server 30 used in this exemplary embodiment.

The workflow server 30 shown in FIG. 3 has an arithmetic unit 301 that controls the operation of the entire apparatus, an HDD 302, an I/O port 303, a communication unit 304 that realizes communication with an external apparatus, an input unit 305 used for inputting, for example, a command, and a display unit 306 used for displaying information. These units are connected by various types of signal lines.

The arithmetic unit 301 is provided with a CPU 301A as an example of a processor, a ROM 301B having a BIOS stored therein, and a RAM 301C used as a work area.

The arithmetic unit 301 is a so-called computer that provides various types of functions by executing programs.

The HDD 302 is a device that drives a magnetic disk serving as a nonvolatile storage medium, and is used as a database (DB) that stores therein various types of data related to the management of the workflow.

In FIG. 3, a workflow table 302A, a user list 302B, a requester list 302C, an electronic document 302D, an application-usage-status DB 302E, and a user authorization DB 302F are shown as examples of the data stored in the HDD 302.

In this exemplary embodiment, the business assistance applications are installed in each information terminal 10. If each business assistance application is to be executed in the workflow server 30, the business assistance application is also stored in the HDD 302.

The workflow table 302A has stored therein various types of data used in the management of the workflow. The various types of data include, for example, a process history of each process performed in the past. The process history includes, for example, information related to an attribute of a user having performed a process, information related to an electronic document having undergone the process, and the contents of the process.

The user list 302B is a list of users authorized to use the workflow. The aforementioned users A to E are managed using the user list 302B.

The requester list 302C is a list of users who have made requests for approval of electronic documents. The data in the requester list 302C is updated every time a request is received.

The electronic document 302D is an electronic document handled in the workflow and is, for example, a contract document or an estimate sheet.

The application-usage-status DB 302E has stored therein, for each business assistance application, data used for managing the usage status of each user.

Figure 4:
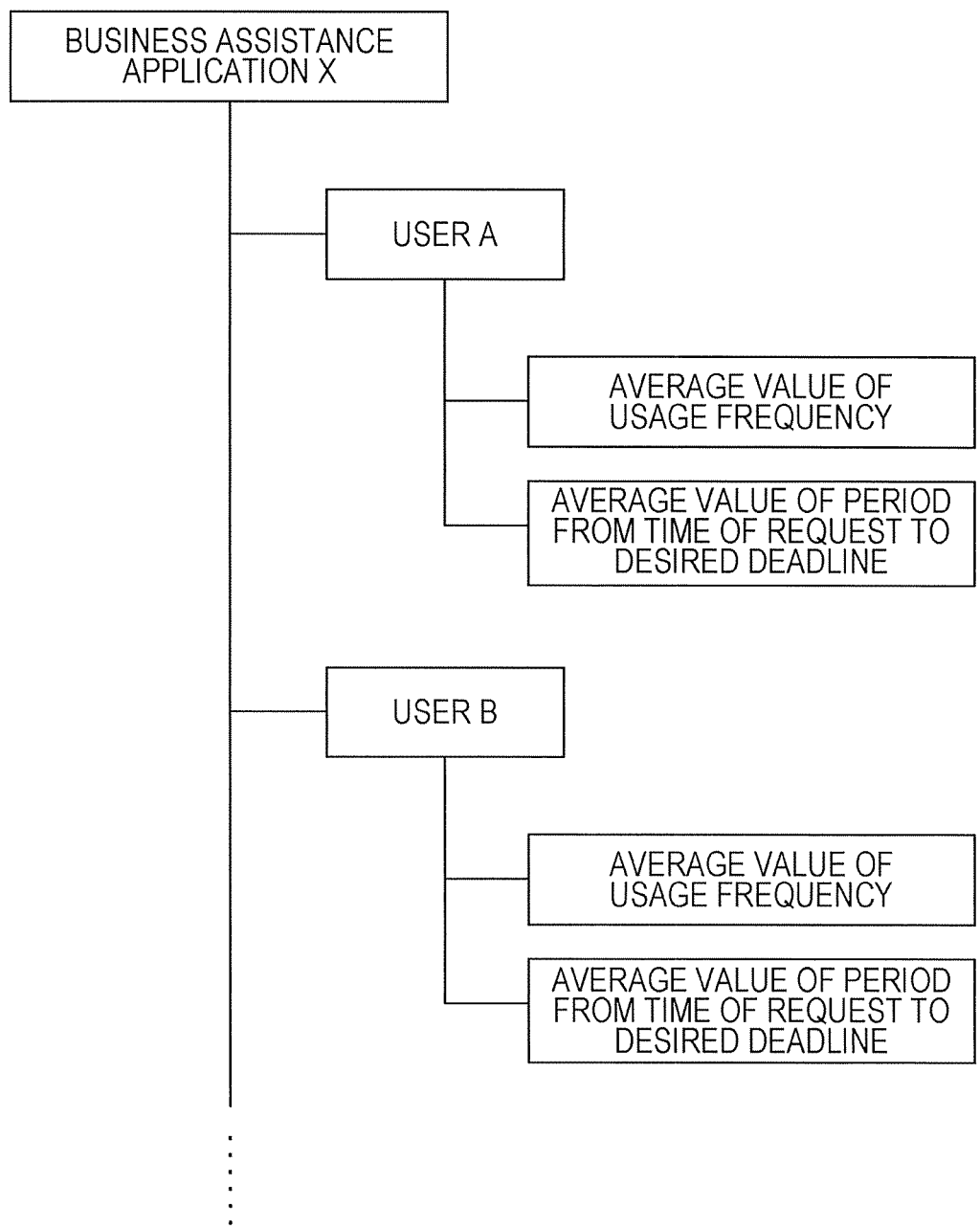
FIG. 4 illustrates a structural example of data stored in an application-usage-status database (DB)

FIG. 4 illustrates a structural example of data stored in the application-usage-status DB 302E.

In FIG. 4, the data structure of a business assistance application X, which is one of multiple business assistance applications, is shown. The data structures of other business assistance applications are the same as the data structure of the business assistance application X.

In the case of FIG. 4, the application-usage-status DB 302E has stored therein, for each business assistance application, an average value of the usage frequency of each user and an average value of a period from the time of a request to a desired deadline. A desired deadline is designated by a requester when making a request.

The average value of the usage frequency and the average value of the period from the time of the request to the desired deadline are calculated based on the process history stored in the workflow table 302A.

In this exemplary embodiment, the usage frequency is used in terms of the frequency of requests. This is because, in this exemplary embodiment, information about the usage frequency is used for finding a user who has a high possibility of making a request. Thus, the number of times a business assistance application is used by a user for a business operation related to an electronic document to be requested for approval is excluded from the calculation for the average value of the usage frequency.

However, in order to enhance the reliability of an average value to be calculated, an average value may be calculated limitedly for a user who has made requests a predetermined times or more. Needless to say, an average value may be calculated if there is a history of a single request.

A period in which an average value is calculated is set to a predetermined period. Examples of the predetermined period include a period from a starting time point of using the workflow management system 1 to the current time point, a period from the previous year to the current time point, a period from the previous half year to the current time point, and a period arbitrarily designated by a manager. Any of these periods may be designated as an initially-set value or may be designated by the manager.

When the target period used for calculating an average value becomes longer, calculated average values may possibly be identical between a user with a high usage frequency in the past but recently with a low usage frequency and a user with a low usage frequency in the past but recently with a high usage frequency.

However, by using a period from the previous year or the previous half year to the current time point as a target period used for calculating an average value, an average value that is closer to the current usage status may be calculated.

The target period used for calculating an average value may be set by a user.

As an alternative to this exemplary embodiment in which an average value of the usage frequency is calculated, the number of times requests are made within a predetermined period may be used instead of or in addition to the average value of the usage frequency.

The predetermined period may be a period from the starting time point of using the workflow management system 1 to the current time point, a period from the previous year to the current time point, a period from the previous half year to the current time point, or a period arbitrarily designated by the manager.

The number of times requests are made in the period from the previous year to the current time point or the number of times requests are made in the period from the previous half year to the current time point is the same as the average value of the number of times requests are made in the same period.

FIG. 5 illustrates a specific example of the application-usage-status DB 302E. The table shown in FIG. 5 indicates the usage status related to the business assistance application X.

In the case of FIG. 5, the average value of the usage frequency of the business assistance application X by the user A is four times per month, and the average value of the period from the time of the request to the desired deadline is five days.

Furthermore, the average value of the usage frequency of the business assistance application X by the user B is once per month, and the average value of the period from the time of the request to the desired deadline is three days. The average value of the usage frequency of the business assistance application X by the user C is once per month, and the average value of the period from the time of the request to the desired deadline is seven days.

In the case of FIG. 5, the usage frequency of the business assistance application X by the user A is the highest, whereas the usage frequency of the business assistance application X by the user C is the lowest. On the other hand, of the users using the business assistance application X, the period from the time of the request by the user B to the desired deadline is the shortest, whereas the period from the time of the request by the user C to the desired deadline is the longest.

Referring back to FIG. 3, the user authorization DB 302F has stored therein data related to whether or not each user is authorized to use or access a business assistance application.

FIG. 6 illustrates a structural example of the data stored in the user authorization DB 302F. In the user authorization DB 302F shown in FIG. 6, a business assistance application that a user is authorized to use or access is given a circular symbol.

For example, the users A and B are authorized to use business assistance applications X, Y, and Z, and a linkage-1. The user C is authorized to use the business assistance applications X, Y, and Z, the linkage-1, and a linkage-2. The user D is authorized to use the business assistance applications X, Y, and Z, a business assistance application XX, the linkage-1, and the linkage-2. The user E is authorized to use the business assistance applications X, Y, Z, and XX, business assistance applications XY and ZY, the linkage-1, and the linkage-2.

As mentioned above, a business assistance application is prepared for assisting with a business operation corresponding to each of the steps defining the workflow.

In contrast, a linkage application corresponding to each of the linkage-1 and the linkage-2 is defined as a combination of multiple business assistance applications. In other words, a linkage application corresponds to one or more steps of multiple steps constituting the overall workflow.

Figure 7:
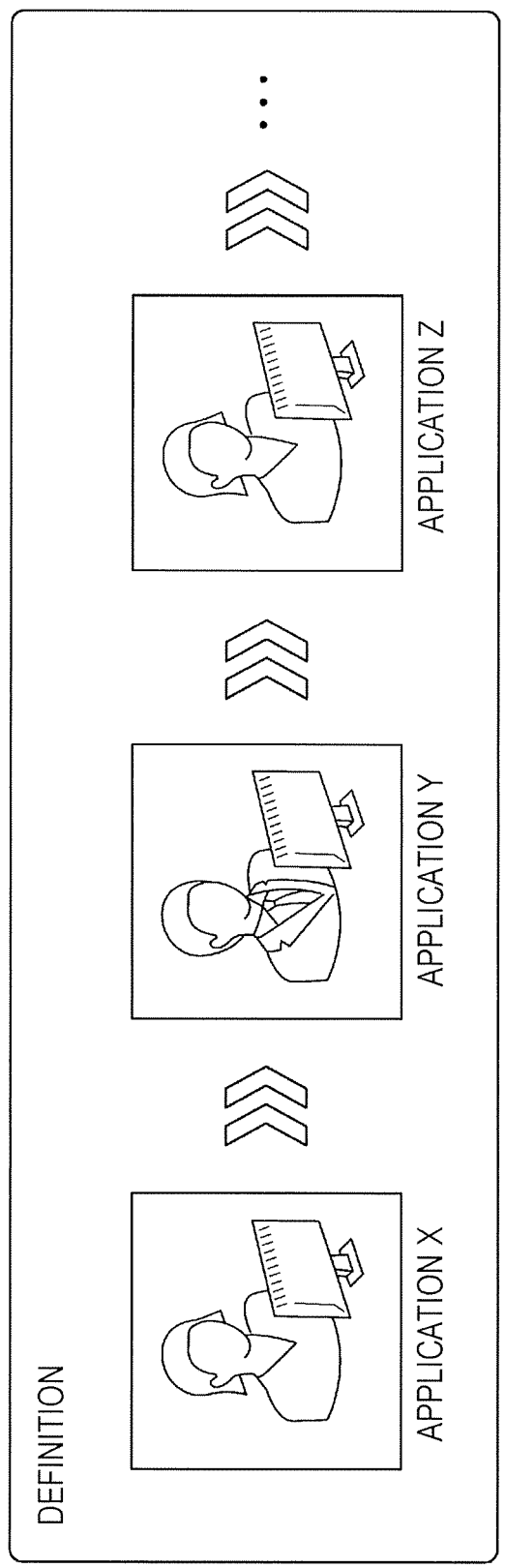
FIG. 7 illustrates an example of the definition of a linkage application.

FIG. 7 illustrates an example of the definition of a linkage application. The linkage application shown in FIG. 7 is defined as a combination of the business assistance application X (i.e., "application X"), the business assistance application Y (i.e., "application Y"), and the business assistance application Z (i.e., "application Z").

A linkage application may be defined by a user or a manager. For example, the application X is used by a user who is in charge of accepting requests, the application Y is used by a user serving as an approver, and the application Z is used by a user who is in charge of a post-approval business operation.

As an alternative to the linkage application shown in FIG. 7 in which multiple business assistance applications are linked in series in the order in which they are to be executed, the linkage application may include a branching path or a coupling path.

Processing by Workflow Server

Processing 1

The following description relates to processing for actively providing a notification indicating that an approver is absent to a user who has a relatively high possibility of causing stagnation to occur in a request process using the workflow.

Figure 8:
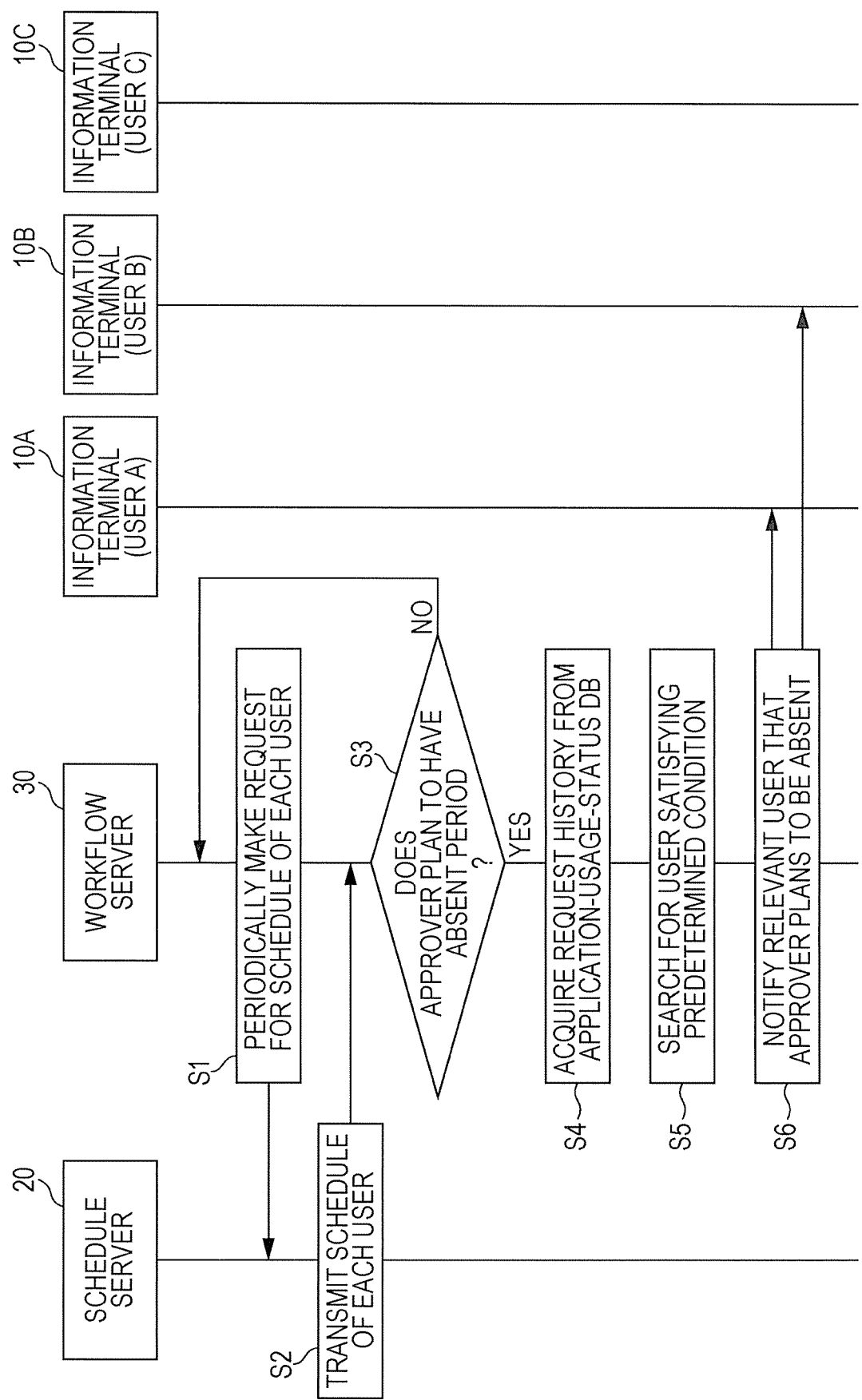
FIG. 8 is a flowchart illustrating an example of processing executed by the workflow server.

FIG. 8 is a flowchart illustrating an example of the processing executed by the workflow server 30. In FIG. 8, reference sign S denotes a step.

Processing 1 is executed regardless of a request made by the user, or rather, processing 1 is executed prior to a request made by the user.

In this exemplary embodiment, the workflow server 30 periodically makes a request for the schedule of each user to the schedule server 20 in step S1.

In order to detect a user who needs to be notified of a plan of absence of the approver, the workflow server 30 makes a request for the schedule of each user at a predetermined cycle.

The predetermined cycle used may be, for example, every 10 minutes, every 30 minutes, every hour, every two hours, every six hours, or every day.

Alternatively, the request for the schedule may be made at a shorter cycle. As another alternative, the request for the schedule of each user may be made at predetermined time points every day or on predetermined days of the week. For example, the request for the schedule may be made at 9:00, 12:00, 15:00, 18:00, and 21:00 from Monday to Friday.

In step S2, the schedule server 20 having received the request transmits the schedule of each user as a response to the request. Alternatively, the schedule server 20 may notify the workflow server 30 of the schedule of each user at a predetermined cycle or at a predetermined time point.

In step S3, the workflow server 30 refers to the received schedule of each user so as to determine whether or not the approver plans to have an absent period.

The approver in this case is an example of a specific user who processes the request. As an alternative to FIG. 8 in which it determined that the user serving as the approver plans to be absent, it may be determined that a user who is in charge of the business operation for the request plans to be absent. In this case, the user who is in charge of the business operation for the request is also an example of a specific user who processes the request.

Although absence for a single day is treated as an absent period in this exemplary embodiment, only an absent period of a predetermined number of consecutive days or more may be detected in step S3. For example, only an absent period of three or more consecutive business days may be detected, whereas an absent period of only a single day may be excluded from the detection target.

Furthermore, a search period for a plan of an absent period may be limited to a range of up to, for example, two months ahead from the current time point. This is because, for example, an absent period planned for one year ahead has no effect on an upcoming request. The workflow server 30 according to this exemplary embodiment searches for an absent period within a range of up to one month ahead from the current time point.

If a negative result is obtained in step S3, the workflow server 30 returns to step S1.

If a positive result is obtained in step S3, the workflow server 30 acquires a request history from the application-usage-status DB 302E (see FIG. 3) in step S4.

In step S5, the workflow server 30 searches for a user satisfying a predetermined condition with respect to the acquired request history.

In this exemplary embodiment, the predetermined condition is satisfied when the request frequency exceeds a threshold value, when the number of times requests are made exceeds a threshold value, or when the period from the time of a request to a desired deadline is shorter than a predetermined value.

For example, the threshold value used with respect to the request frequency is three times per month. For example, the threshold value used with respect to the number of times requests are made is 36 times per year. For example, the threshold value used with respect to the period from the time of the request to the desired deadline is four days.

Any of the above threshold values is selected in accordance with, for example, a criterion for determining a user who has a high possibility of making a request within a few days. The threshold values may be given as initially-set values or may be set by the manager.

When the search for a user satisfying the predetermined condition is completed, the workflow server 30 notifies the relevant user of the plan of absence of the approver in step S6. The notification in this case may involve the use of an electronic mail or a push notification. In the case of the push notification, a message is displayed regardless of a user operation even in a state where, for example, a workflow home screen is not opened by the user.

Figure 9:
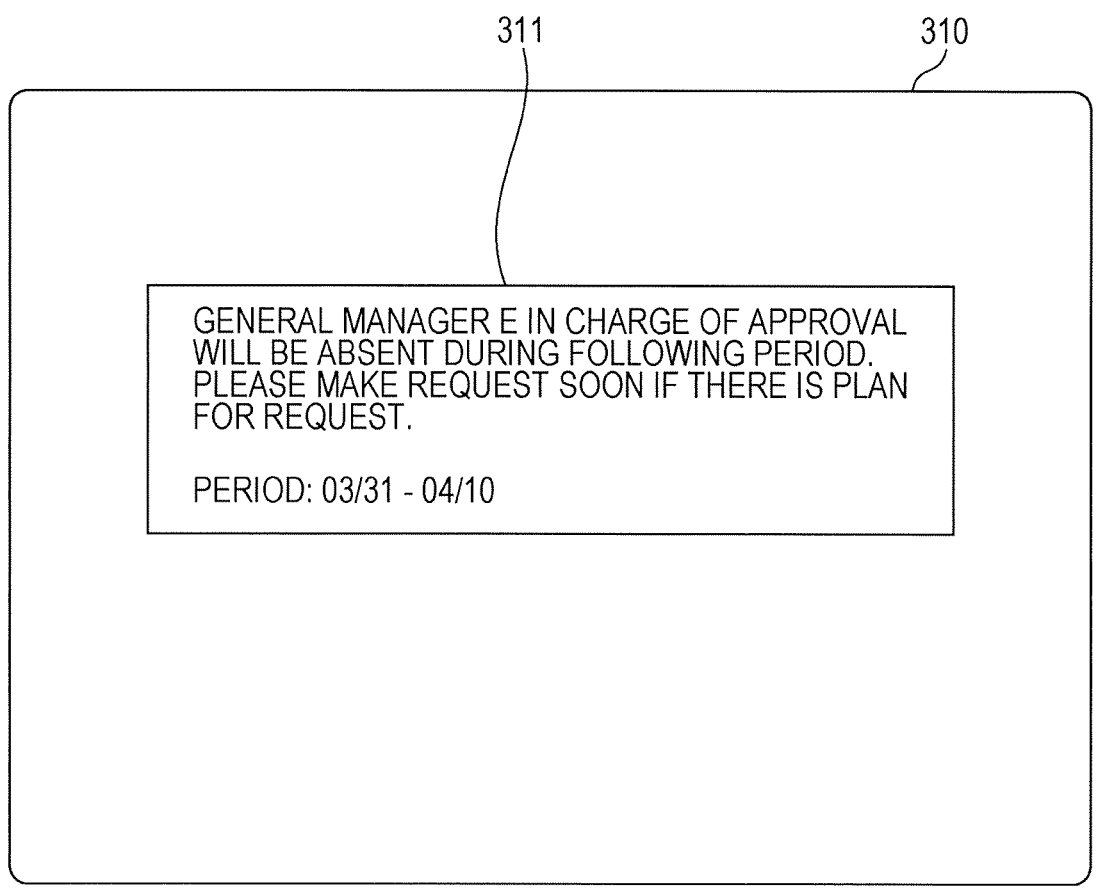
FIG. 9 illustrates an example of a screen displayed on an information terminal used by a user satisfying a predetermined condition.

FIG. 9 illustrates an example of a screen 310 displayed on the information terminal 10 used by the user satisfying the predetermined condition.

The screen 310 is displayed on the information terminal 10 operated by the user satisfying the condition in step S5 (see FIG. 8). In this exemplary embodiment, the screen 310 is displayed on the information terminal 10A (see FIG. 1) operated by the user A whose average value of the usage frequency has exceeded the threshold value and on the information terminal 10B (see FIG. 1) operated by the user B whose average value of the period from the time of the request to the desired deadline is smaller than the threshold value.

Since the screen 310 is displayed based on the past request history, it is not clear whether the user A and the user B plan to make requests within a few days.

As a message 311 to each user satisfying the condition, the screen 310 presents a plan of absence of an approver causing stagnation in the request process, request-prompting text, and an absent period.

In the case of FIG. 9, the presented message 311 reads "General manager E in charge of approval will be absent during following period.", "Please make request soon if there is plan for request.", and "Period: 03/31-04/10".

By displaying this screen 310, the user A and the user B who have a high possibility of making requests may be informed that the general manager E in charge of approval plans to be absent.

Each user to which the screen 310 is to be displayed has a higher possibility of making a request than other users. In other words, each user to which the screen 310 is to be displayed is likely to be affected by stagnation in a request process.

By displaying the screen 310, the user A may make a request earlier than planned to avoid stagnation in the request process.

On the other hand, the user B makes requests less frequently than the user A, but has a shorter period from the time of a request to a desired deadline than other users. In other words, due to the absence of the general manager E, the user B has a higher risk of not being able to obtain approval before the desired deadline than other users. This is because, on average, the user B has a fewer number of days from the time of the request to the time of approval than other users.

However, in this exemplary embodiment, the user B is informed of the absence of the general manager E in advance, so that the user B has an increased possibility of making the request sooner than usual. As a result, approval may be readily obtained prior to the desired deadline in accordance with stagnation in the request process.

In this exemplary embodiment, a user with a high possibility of making a request is notified that the user E as an approver plans to be absent within a period from the current time point to one month ahead, so that the possibility in which the approval for the request is completed prior to the absent period may be higher, as compared with a case where no notifications are provided whatsoever.

In reality, there is also a possibility in which a plan for absence is registered in the schedule at short notice. Even in that case, a notification about the plan of absence is provided in advance, so that the possibility of stagnation in a request process caused by such absence may be reduced.

A history of a request made after the screen 310 is displayed may be excluded from the average value of the period from the time of the request to the desired deadline in the application-usage-status DB 302E (see FIG. 3). This is because a request made after the screen 310 is displayed has a high possibility in that the request may involve an exceptional action that does not reflect an action unique to the user. Whether or not the aforementioned history is to be excluded may be settable.

As an alternative to this exemplary embodiment in which the screen 310 presents an absent period, the screen 310 may simply present that there is a plan of absence. Even in this case, a user planning to make a request is informed in advance that the general manager E plans to be absent, so as to be capable of taking action, such as checking the schedule.

Furthermore, the screen 310 may include a reason for the absence. By ascertaining the reason, a user may readily assume, for example, a change of an absent period.

Moreover, the screen 310 may display information about a user performing an approval process in place of the general manager E during an absent period.

Processing 2

The notification in processing 1 described above requires a request history at least once. This is because a user who has never made a request has no request history.

Therefore, in the case of processing 1 described above, a user who has never made a request in the past is not notifiable that an approver plans to be absent.

The following description relates to processing 2 that provides a notification to a user who is not capable of receiving a plan of absence of an approver in processing 1.

Figure 10:
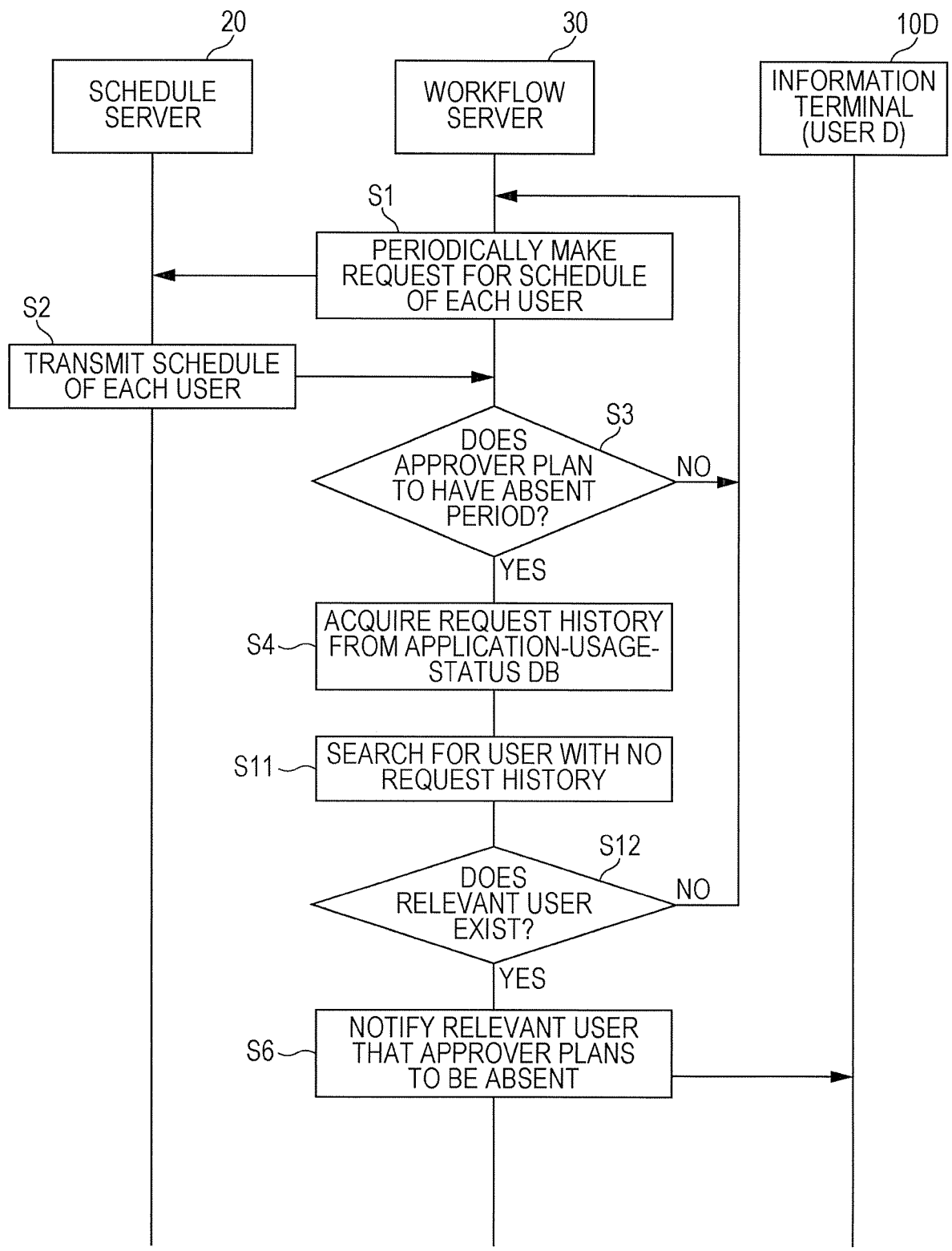
FIG. 10 is a flowchart illustrating an example of another processing executed by the workflow server.

FIG. 10 is a flowchart illustrating an example of another processing executed by the workflow server 30. In FIG. 10, sections corresponding to those in FIG. 8 are given corresponding reference signs.

The processing according to this exemplary embodiment is executed regardless of a request made by a user.

In processing 2, step S1 to step S4 are identical to those in processing 1.

Specifically, the workflow server 30 periodically makes a request for the schedule of each user to the schedule server 20 in step S1.

In step S2, the schedule server 20 having received the request transmits the schedule of each user as a response to the request.

In step S3, the workflow server 30 refers to the received schedule of each user so as to determine whether or not an approver who is to approve the request plans to have an absent period. If a negative result is obtained in step S3, the workflow server 30 returns to step S1. If a positive result is obtained in step S3, the workflow server 30 acquires a request history from the application-usage-status DB 302E (see FIG. 3) in step S4.

Subsequently, in step S11, the workflow server 30 searches for a user with no request history. This is because processing 2 is targeted for providing a notification to a user with no request history. If there is a user excluded from the notification target in processing 1 due to the number of times requests are made not satisfying the threshold value, such a user is also searched for in step S11.

In step S12, the workflow server 30 determines whether or not a relevant user exists.

If a negative result is obtained in step S12, the workflow server 30 returns to step S1 since there is no user who should receive the notification.

If a positive result is obtained in step S12, the workflow server 30 notifies the relevant user in step S6 that the approver plans to be absent.

In the case of FIG. 10, the information is reported to the information terminal 10D operated by the user D. The information terminal 10D operated by the user D displays, for example, the screen 310.

The user D serving as the notification target in processing 2 has never made a request in the past. Thus, there is a possibility that the displaying of the screen 310 may annoy the user D.

In view of this, the workflow server 30 according to this exemplary embodiment is also provided with a function for providing a notification indicating that the general manager E as an approver is absent when the user D serving as the notification target opens the workflow home screen.

Figure 11:
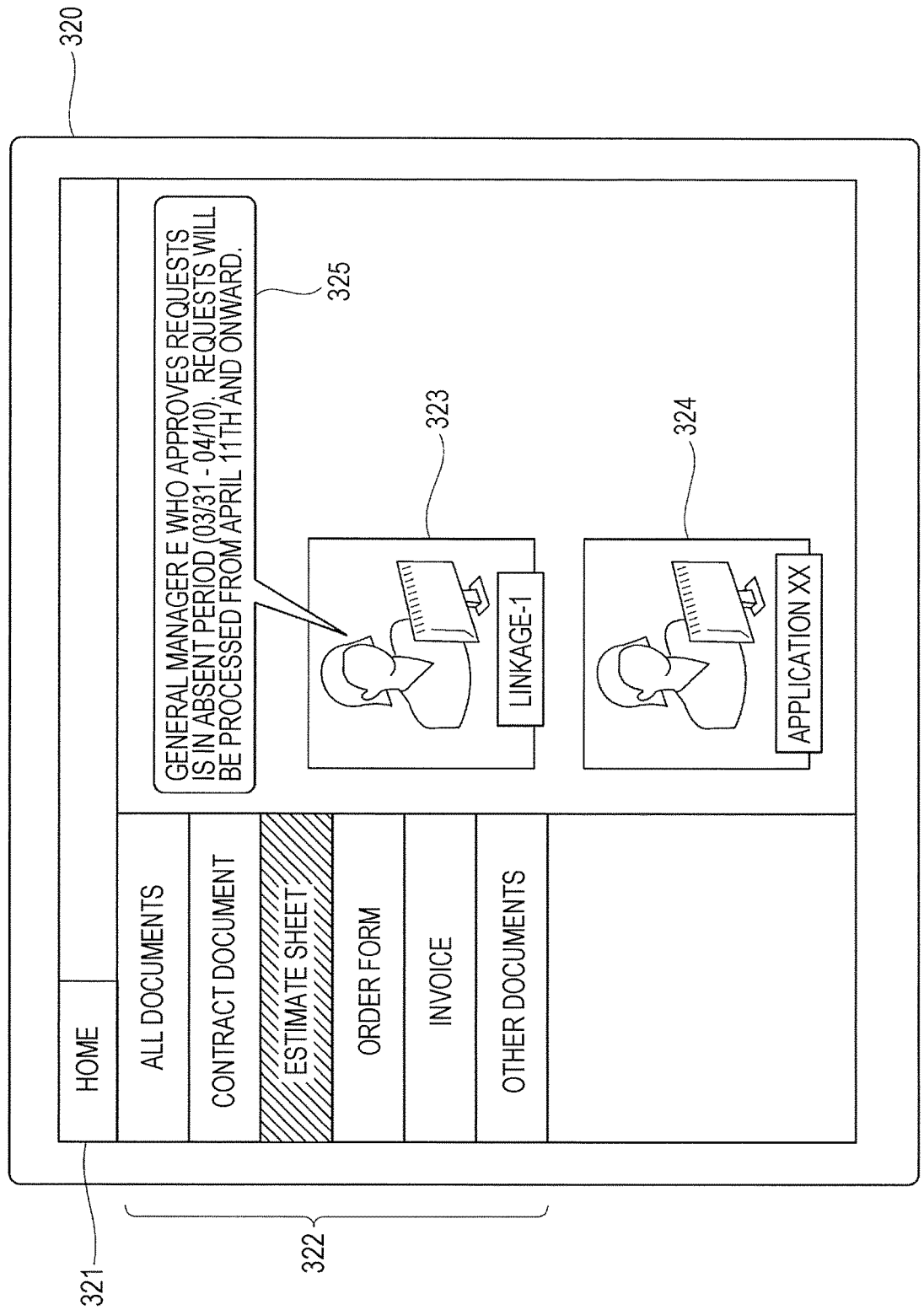
FIG. 11 illustrates an example of a screen displayed on an information terminal used by a user with no request history.

FIG. 11 illustrates an example of a home screen 320 displayed on an information terminal 10 used by a user with no request history.

The home screen 320 shown in FIG. 11 displays a workflow home screen 321.

At the left side of the workflow home screen 321 is displayed a selection field 322 for documents to be requested for approval. The selection field 322 shows "all documents", "contract document", "estimate sheet", "order form", "invoice", and "other documents" as options. In the case of FIG. 11, an estimate sheet is selected.

At the right side of the home screen 320 shown in FIG. 11 are displayed icons 323 and 324 for business assistance applications that the user D is authorized to used. In the case of FIG. 11, the icon 323 corresponds to "linkage-1" as one of the linkage applications. The icon 324 corresponds to the business assistance application XX (i.e., "application XX"). Icons corresponding to other business assistance applications X, Y, and Z that the user D is authorized to use are not displayed for the sake of convenience.

In the case of FIG. 11, a business assistance application affected by the absence of the user E as an approver is a linkage application used by the user D for requesting for approval of an estimate sheet. Therefore, in FIG. 11, a message 325 is displayed in a pop-up fashion from the icon 323 corresponding to "linkage-1". Since the application XX is not affected by the absence of the user E, the message 325 is not added thereto.

The icon 323 in this case is an example of a button used for making a request.

The message 325 presents the plan of absence of the approver causing stagnation in the request process, the absent period, and the time when the processing of the request is expected to resume.

The message 325 shown in FIG. 11 includes the text "General manager E who approves requests is in absent period (03/31-04/10)." and the text "Requests will be processed from April 11th and onward.". In the case of FIG. 11, the screen indicates the time when the processing of the request is expected to resume, and is different from the screen 310 (see FIG. 9) in that the screen does not include request-prompting text.

Alternatively, such request-prompting text may be included in the message 325. Moreover, the time when the processing of the request is expected to resume may be similarly added to the message 311 (see FIG. 9) on the screen 310.

In the case of FIG. 11, the message 325 is displayed in association with the icon 323 for the business assistance application XX to be used for making a request, but may be displayed without being linked with an icon. For example, in a case where multiple icons corresponding to business assistance applications related to approval by the general manager E are displayed on the home screen 320, if messages 325 are displayed in an overlapping manner, it becomes difficult to check the information. In such a case, a single message 325 may be displayed at a location unrelated to the icons, thereby enhancing the viewability of the home screen 320.

Furthermore, instead of being linked with the icons of all business assistance applications related to approval by the general manager E, the message 325 may be displayed in linkage with only one of the icons, such that, every time the user D selects another icon, the message 325 is displayed in linkage with the selected icon.

Processing 3

Processing 1 and processing 2 described above are intended for providing a notification indicating that an approver plans to be absent to a user having a possibility of making a request.

However, even if the requester receiving the notification in processing 1 or processing 2 makes a request ahead of schedule, the circulation of the request may stagnate if there is a delay in the circulation from a user performing paperwork for the request to the approver.

The following description relates to processing 3 in which, of users in charge of the paperwork for a request accepted by the workflow, a user performing the paperwork upstream of the approver is actively notified that the approver plans to be absent.

Figure 12:
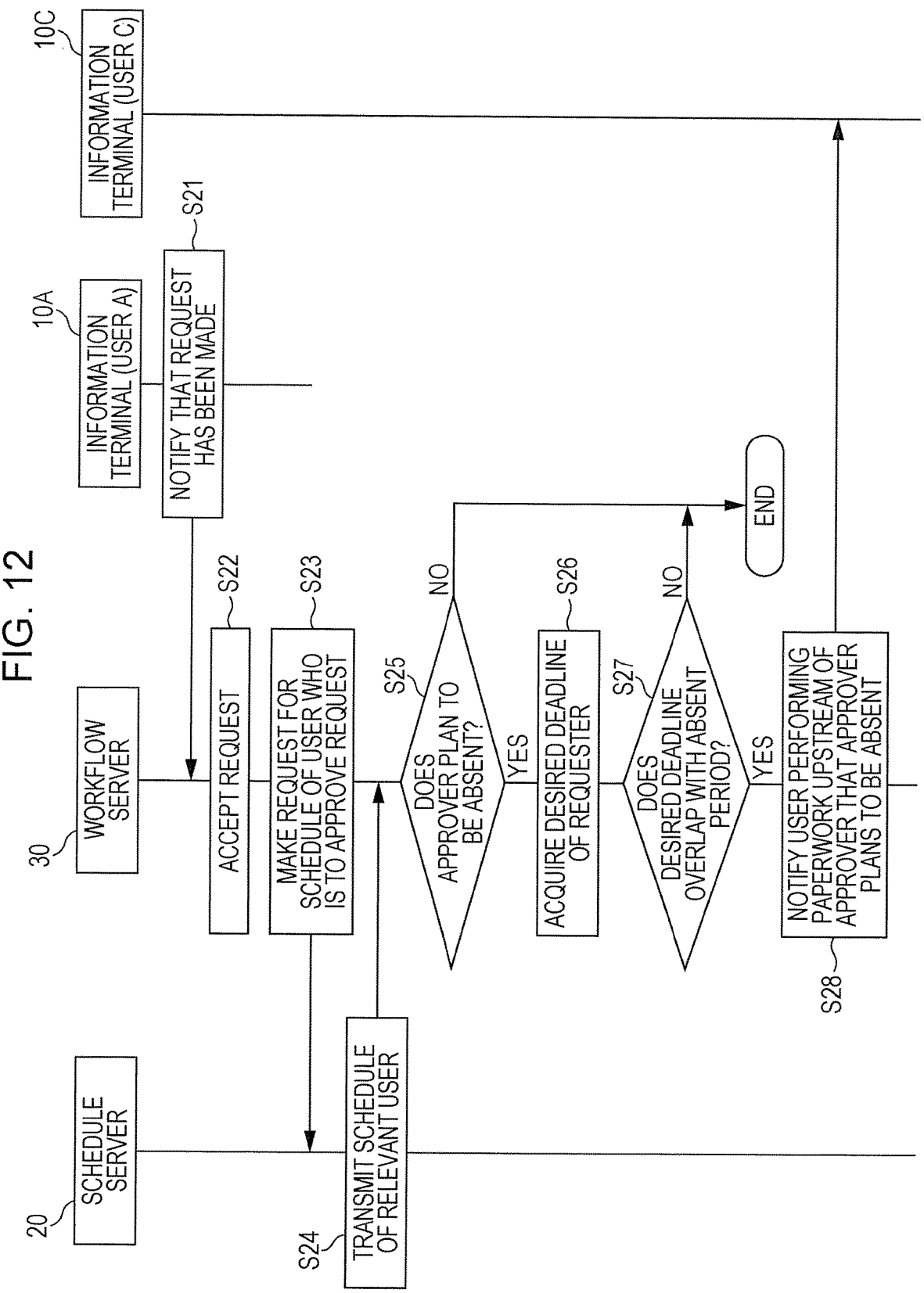
FIG. 12 is a flowchart illustrating an example of another processing executed by the workflow server.

FIG. 12 is a flowchart illustrating an example of another processing executed by the workflow server 30.

In the case of FIG. 12, the requester is the user A, and the person in charge of the paperwork for an electronic document to be circulated to the user E as an approver is the user C.

Figure 13:
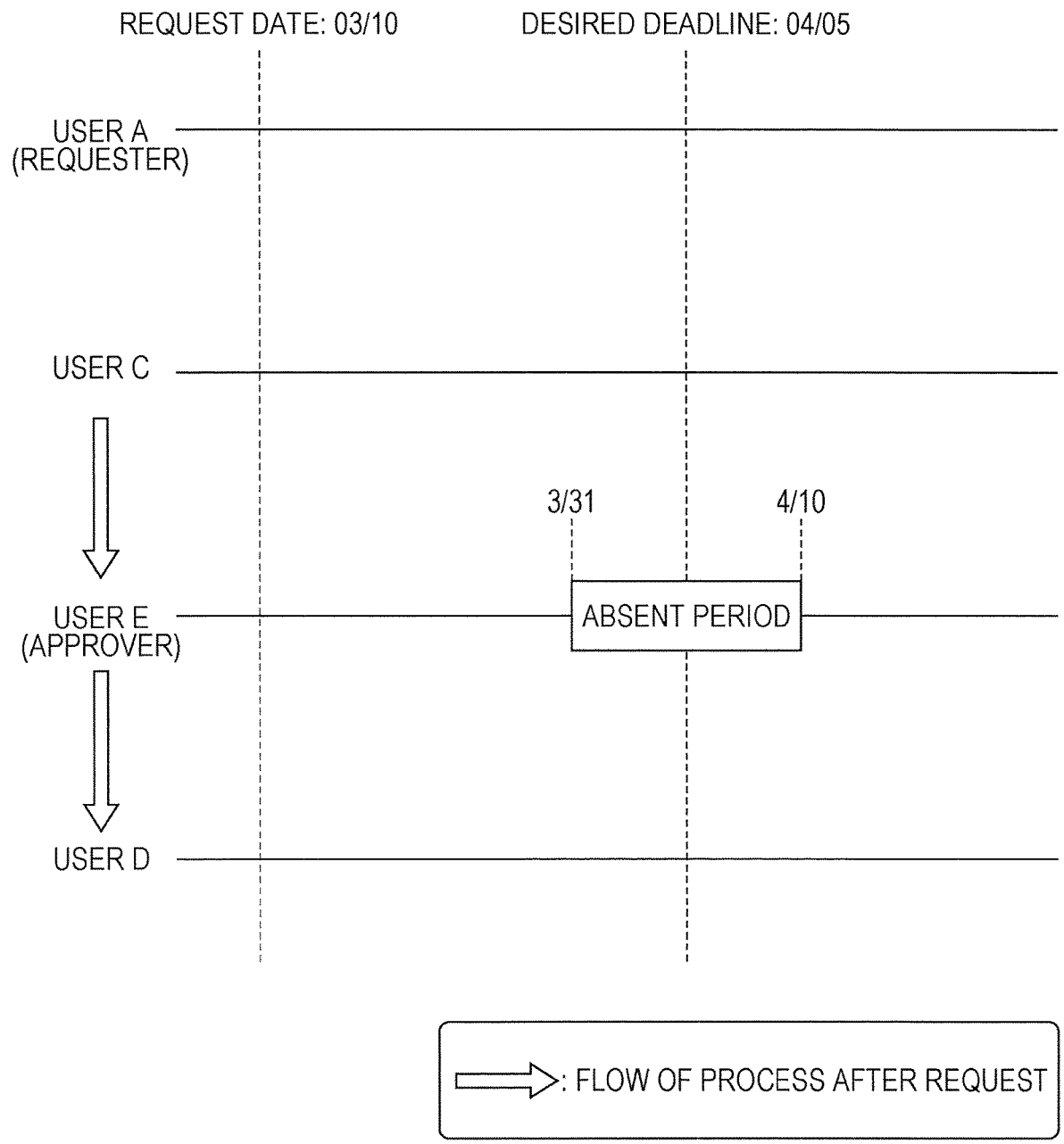
FIG. 13 illustrates the relationship between the flow of a process after a request assumed in the processing and an absent period of a user as an approver.

FIG. 13 illustrates the relationship between the flow of a process after a request assumed in processing 3 and the absent period of the user E as an approver.

First, the user A makes a request on March 10th. A desired deadline designated by the user A is April 5th. The absent period of the user E as an approver is 11 days from March 31st to April 10th, and thus overlaps with the desired deadline.

An electronic document that the user A has requested for approval undergoes paperwork by the user C and is circulated to the user E as an approver. Subsequently, the electronic document is approved by the user E and is circulated to the user D. In the case of FIG. 13, even if the user C and the user D are absent, other users may serve as substitutes for performing the paperwork. Therefore, the circulation of the request of the user A stagnates due to a delay in the approval caused by the absence of the user E.

Figure 14:
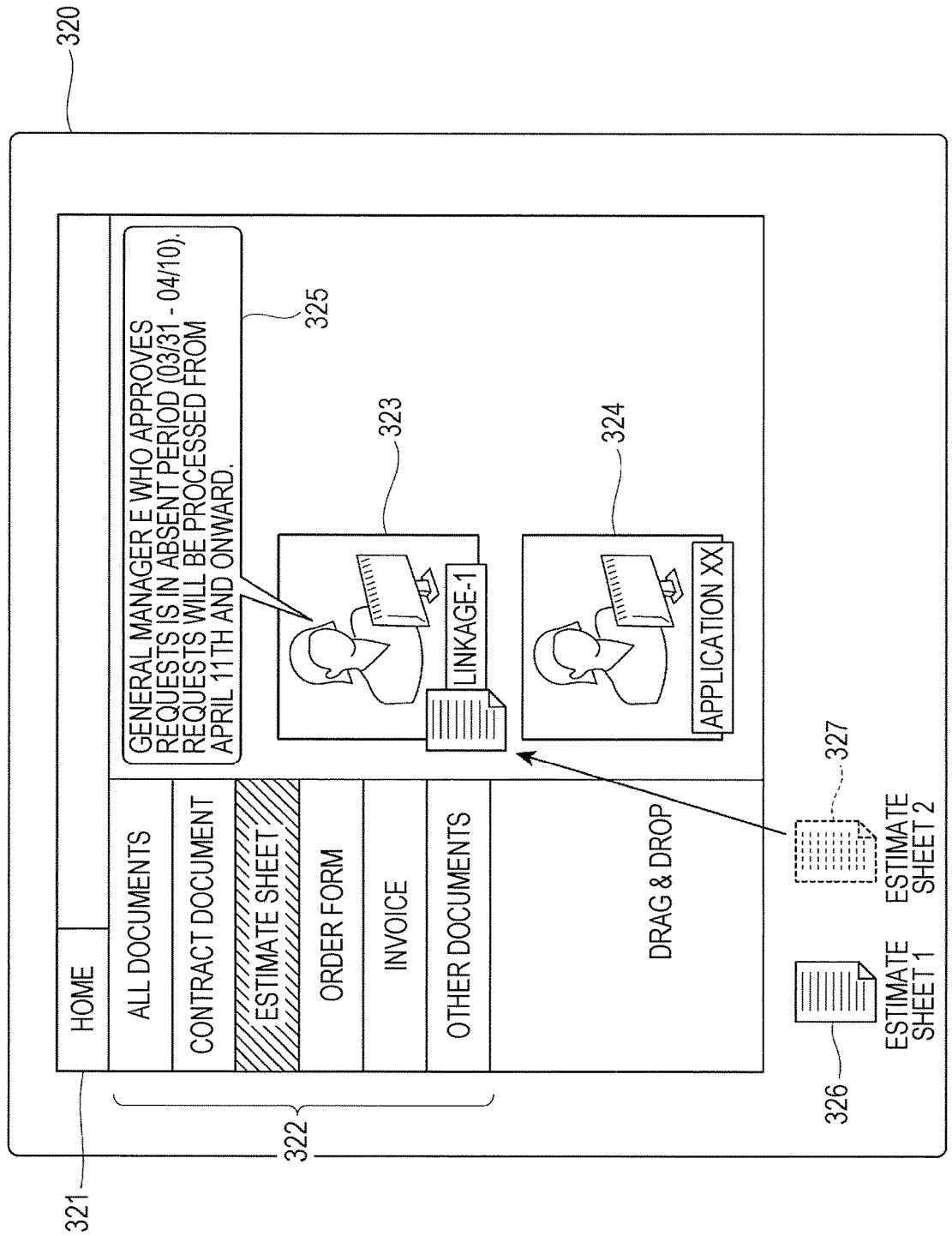
FIG. 14 illustrates an estimate-sheet request process performed by a user.

FIG. 14 illustrates an estimate-sheet request process performed by the user A. In FIG. 14, sections corresponding to those in FIG. 11 are given corresponding reference signs.

At the lower section of the home screen 320 shown in FIG. 14 are displayed two icons 326 and 327 corresponding to estimate sheets to be requested for approval. The icon 326 corresponds to an "estimate sheet 1", and the icon 327 corresponds to an "estimate sheet 2".

If a user desires to request for approval of the "estimate sheet 2", the user moves the icon 327 corresponding to the "estimate sheet 2" to the position of the icon 323 corresponding to the "linkage-1". This movement is a so-called drag-and-drop operation.

Referring back to FIG. 12, the information terminal 10A detecting this operation notifies the workflow server 30 in step S21 that a request has been made.

When the workflow server 30 accepts the request in step S22, the workflow server 30 makes a request for the schedule of a user who is to approve the request to the schedule server 20 in step S23. The user who is to approve the request is identified in accordance with the contents of the activated business assistance application or the electronic document requested for approval. In this exemplary embodiment, a user authorized to approve the request of the estimate sheet is the user E.

In step S24, the schedule server 20 transmits the schedule of the relevant user as a response to the request.

In step S25, the workflow server 30 having received the schedule determines whether or not the approver plans to be absent.

If the user E as an approver does not have a plan to be absent, the workflow server 30 obtains a negative result in step S25.

In this case, the workflow server 30 does not have to provide a notification indicating that the user E as an approver plans to be absent. Therefore, the workflow server 30 ends the process for providing a notification about a plan of absence. The request that the user C is in charge of is reported to the user C from the workflow server 30.

In contrast, if the user E as an approver plans to be absent, the workflow server 30 obtains a positive result in step S25.

In this case, the workflow server 30 acquires a desired deadline of the requester in step S26.

Then, in step S27, the workflow server 30 determines whether or not the desired deadline overlaps with the absent period.

If a negative result is obtained in step S27, the workflow server 30 does not notify the user C that the user E as an approver plans to be absent, similarly to the case where the negative result is obtained in step S25.

In contrast, if a positive result is obtained in step S27, the workflow server 30 notifies a user performing paperwork upstream of the approver that the approver plans to be absent in step S28.

As mentioned above, in this exemplary embodiment, the approver is the user E, and the user performing paperwork upstream thereof is the user C.

Thus, the workflow server 30 notifies the user C that the user E plans to be absent.

Figure 15:
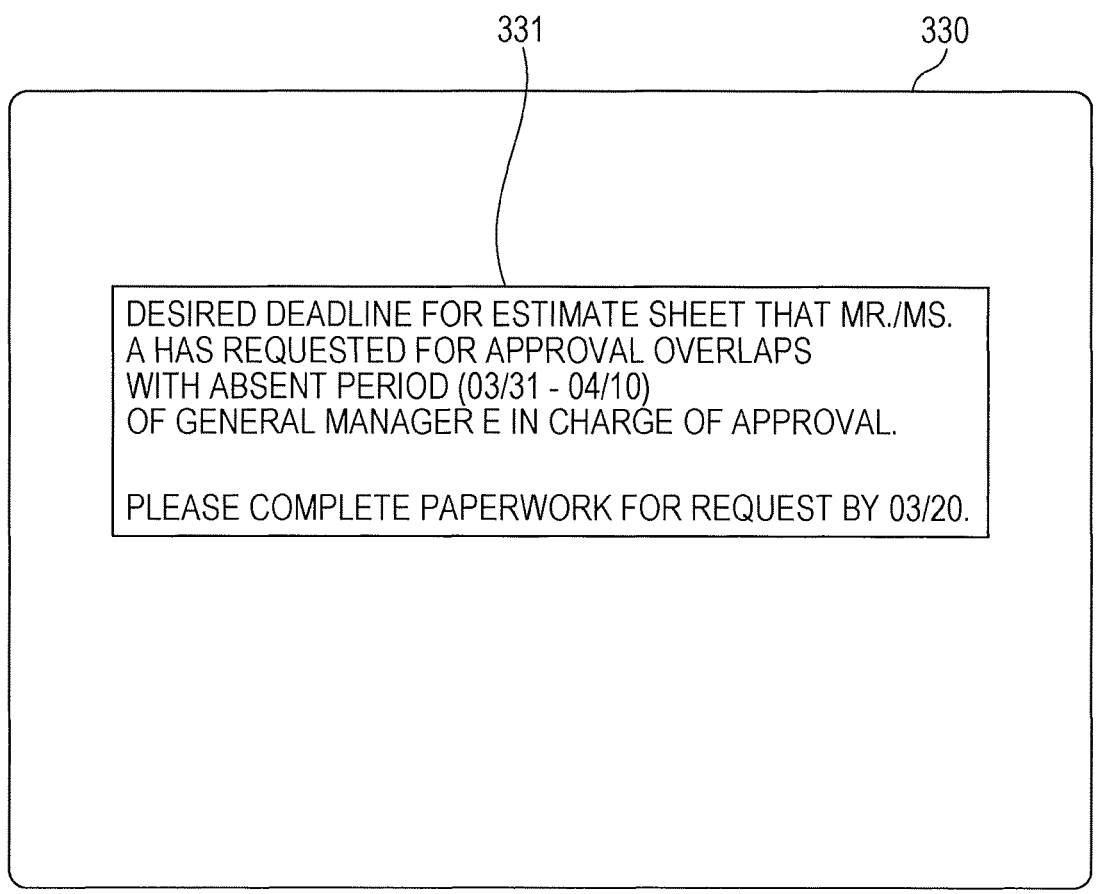
FIG. 15 illustrates an example of a screen displayed on an information terminal operated by a user who is in charge of paperwork for a request to be circulated to an approver.

FIG. 15 illustrates an example of a screen 330 displayed on the information terminal 10C operated by the user C who is in charge of paperwork for a request to be circulated to an approver.

The user C in this case is an example of a user processing a request immediately before an approver.

As a message 331 to a user satisfying a condition, the screen 330 presents a message indicating that a desired deadline for the request overlaps with a plan of absence of the approver and also presents a target date for the completion of the paperwork. The target date for the completion of the paperwork is an example of a processing deadline.

The message 331 shown in FIG. 15 reads "Desired deadline for estimate sheet that Mr./Ms. A has requested for approval overlaps with absent period (03/31-04/10) of general manager E in charge of approval." and "Please complete paperwork for request by 03/20.".

As an alternative to the case of FIG. 15 in which the information about the absent period of the general manager E as an approver is included, the target date for the completion of the paperwork may be simply displayed without having a specific indication about the absent period. With the clear indication of the target date for the completion of the paperwork, the user C may readily ascertain the schedule.

In contrast, the absent period may be specifically displayed without having specific information about the target date for the completion of the paperwork.

In the case of FIG. 15 in which the target date for the completion of the paperwork is set to a date that is 11 days prior to the first day of the absent period, this period may be given as an initial value or may be set by the manager. Furthermore, the target date and the period for setting the target date may be set individually by the user E as an approver.

In the case of processing 3, it is assumed that there is a single processing step before the approver who plans to be absent. If there are multiple steps, users in charge of business operations corresponding to the individual steps may be notified that the approver plans to be absent. The notification in this case may similarly involve the use of an electronic mail or a push notification.

Other Exemplary Embodiments

Although the exemplary embodiment of the present disclosure has been described above, the technical scope of the present disclosure is not limited to the above exemplary embodiment. It is obvious from the claims that exemplary embodiments obtained by adding various modifications or alterations to the above exemplary embodiment are included in the technical scope of the present disclosure.

For example, as an alternative to the above exemplary embodiment in which a single approver appears for the procedure after a request is accepted, there may be multiple approvers. For example, depending on the fee involved in making a request, approval from a higher-ranked officer may be required after approval from a first approver. In that case, an absent period is determined for each of the multiple approvers.

If there are multiple approvers and multiple absent periods are detected, the absent period of the highest officially ranked approver of the approvers corresponding to the multiple absent periods may be used as a reference.

Furthermore, the process executed by the workflow server 30 in the above exemplary embodiment may partially be executed by the schedule server 20, or the process executed by the schedule server 20 may partially be executed by the workflow server 30.

Moreover, the workflow server 30 may execute the above-described functions by operating in cooperation with an external server other than the schedule server 20.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
acquire a schedule of each of a plurality of users registered in a workflow system periodically or at predetermined time points,
acquire a flow of a plurality of operations, wherein each of the plurality of operations requires an approver to authorize a request regarding the corresponding operation,
detect a plan of absence of any user among the approvers from the acquired schedule of each of the plurality of users,
in response to the plan of absence of a specific user among the approvers being detected and in response to the specific user being the approver to authorize a request regarding a specific operation among the plurality of operations, display a plurality of icons corresponding to the specific operation with a notification on a user terminal of a relevant user who has a possibility of making the request regarding the specific operation during the absence of the specific user based on a request history stored in the workflow system and display at least one object corresponding to the specific operation that requires the specific user to approve on the user terminal, wherein the notification is displayed in association with a specific icon among the plurality of icons, detect a drag-and-drop operation performed between any of the at least one object and the specific icon, and in response to the drag-and-drop operation being detected between a specific object among the at least one object and the specific icon, request the specific user to approve the request regarding the specific operation.

2. The information processing apparatus according to claim 1, wherein the processor sets a user satisfying a predetermined condition with respect to the request history as the relevant user who has the possibility of making the request.

3. The infatuation processing apparatus according to claim 2, wherein the user satisfying the condition is a user who has made requests for a number of times or at a frequency exceeding a predetermined threshold value.

4. The information processing apparatus according to claim 2, wherein the user satisfying the condition is a user whose average value of a length of a period from when a request is made to a desired deadline is smaller than a predetermined threshold value.

5. The information processing apparatus according to claim 1, wherein the processor displays the plan of absence of the specific user on a screen used for making the request.

6. The information processing apparatus according to claim 5, wherein the processor further displays a time when the specific user is to resume the processing of the request in addition to the plan of absence.

7. The information processing apparatus according to claim 6, wherein the time is displayed on a screen used for making the request by a user who is not notified that the specific user plans to be absent.

8. The information processing apparatus according to claim 5, wherein the plan of absence of the specific user is displayed in association with a button used for making the request.

9. The information processing apparatus according to claim 8, wherein a time when the specific user is to resume the processing of the request is also displayed in association with the button.

10. The information processing apparatus according to claim 1, wherein if the plan of absence of the specific user overlaps a desired deadline indicated in the request, the processor transmits a notification prompting a user processing the request prior to the specific user to perform the processing.

11. The information processing apparatus according to claim 10, wherein a transmission destination for the notification prompting the user to perform the processing is a user processing the request immediately before the specific user.

12. The information processing apparatus according to claim 10, wherein the notification prompting the user to perform the processing includes an absent period of the specific user.

13. The information processing apparatus according to claim 11, wherein the notification prompting the user to perform the processing includes an absent period of the specific user.

14. The information processing apparatus according to claim 10, wherein the notification prompting the user to perform the processing includes a processing deadline demanded to a user receiving the notification.

15. The information processing apparatus according to claim 11, wherein the notification prompting the user to perform the processing includes a processing deadline demanded to a user receiving the notification.

16. A non-transitory computer readable medium storing a program causing a computer to execute a process, the process comprising:

acquiring a schedule of each of a plurality of users registered in a workflow system periodically or at predetermined time points;

acquiring a flow of a plurality of operations, wherein each of the plurality of operations requires an approver to authorize a request regarding the corresponding operation;

detecting a plan of absence of any user among the approvers from the acquired schedule of each of the plurality of users;

in response to the plan of absence of a specific user among the approvers being detected and in response to the specific user being the approver to authorize a request regarding a specific operation among the plurality of operations, displaying a plurality of icons corresponding to the specific operation with a notification on a user terminal of a relevant user who has a possibility of making the request regarding the specific operation during the absence of the specific user based on a request history stored in the workflow system and displaying at least one object corresponding to the specific operation that requires the specific user to approve on the user terminal, wherein the notification is displayed in association with a specific icon among the plurality of icons;

detecting a drag-and-drop operation performed between any of the at least one object and the specific icon; and in response to the drag-and-drop operation being detected between a specific object among the at least one object and the specific icon, requesting the specific user to approve the request regarding the specific operation.

17. An information processing apparatus comprising:

means for acquiring a schedule of each of a plurality of users registered in a workflow system periodically or at predetermined time points;

means for acquiring a flow of a plurality of operations, wherein each of the plurality of operations requires an approver to authorize a request regarding the corresponding operation;

means for detecting a plan of absence of any user among the approvers from the acquired schedule of each of the plurality of users;

means for, in response to the plan of absence of a specific user among the approvers being detected and in response to the specific user being the approver to authorize a request regarding a specific operation among the plurality of operations, displaying a plurality of icons corresponding to the specific operation with a notification on a user terminal of a relevant user who has a possibility of making the request regarding the specific operation during the absence of the specific user based on a request history stored in the workflow system and displaying at least one object corresponding to the specific operation that requires the specific user to approve on the user terminal, wherein the notification is displayed in association with a specific icon among the plurality of icons;

means for detecting a drag-and-drop operation performed between any of the at least one object and the specific icon; and means for, in response to the drag-and-drop operation being detected between a specific object among the at least one object and the specific icon, requesting the specific user to approve the request regarding the specific operation.

\* \* \* \* \*